(12) United States Patent
Kitahara (10) Patent No.: US 7,078,664 B2
(45) Date of Patent: Jul. 18, 2006

(54) CONFOCAL LASER MICROSCOPE DISPLAYING TARGET IMAGES SIDE BY SIDE

(75) Inventor: Akihiro Kitahara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/986,493

(22) Filed: Nov. 10, 2004

(65) Prior Publication Data

US 2005/0139748 A1    Jun. 30, 2005

(30) Foreign Application Priority Data

Nov. 19, 2003    (JP)    .............................. 2003-388823

(51) Int. Cl.
| | |
|---|---|
| G02B 27/64 | (2006.01) |
| G02B 27/40 | (2006.01) |
| G02B 7/04 | (2006.01) |
| H01J 40/14 | (2006.01) |
| H01J 3/14 | (2006.01) |
| H01J 5/16 | (2006.01) |

(52) U.S. Cl. .................. 250/201.3; 250/234; 359/389; 359/393

(58) Field of Classification Search ............ 250/201.3, 250/216, 234; 359/362, 368, 385–389, 392–393
See application file for complete search history.

(56) References Cited

U.S. PATENT DOCUMENTS 5,874,726 A * 2/1999 Haydon ................... 250/201.1
5,932,871 A * 8/1999 Nakagawa et al. ...... 250/201.3

FOREIGN PATENT DOCUMENTS

| JP | 9-133869 | 5/1997 |
|---|---|---|
| JP | 2000-98241 | 4/2000 |
| JP | 3326881 | 7/2002 |
| JP | 3326881 | 9/2002 |
| JP | 2005-114713 | 4/2005 |

OTHER PUBLICATIONS

Patent Abstracts of Japan, Abstract for Japanese Publication No. 07-013083, published Jan. 17, 1995.

* cited by examiner

Primary Examiner—Stephone B. Allen
Assistant Examiner—Patrick J. Lee
(74) Attorney, Agent, or Firm—Scully, Scott, Murphy & Presser, P.C.

(57) ABSTRACT

In a confocal laser microscope, a confocal image and a non-confocal image of an observation target are generated from light reflected by the observation target, and the confocal image and non-confocal image are displayed side by side on the same screen.

34 Claims, 7 Drawing Sheets

CONFOCAL LASER MICROSCOPE DISPLAYING TARGET IMAGES SIDE BY SIDE

CROSS REFERENCE TO RELATED APPLICATIONS

This application is based upon and claims the benefit of priority from the prior Japanese Patent Application No. 2003-388823, filed Nov. 19, 2003, the entire contents of which are incorporated herein by this reference.

BACKGROUND OF THE INVENTION

1. Field of the Invention

The present invention relates to a confocal laser microscope capable of obtaining a confocal (CF) image and a non-confocal (NCF) image of a specimen to be observed.

2. Description of the Related Art

Recently, an optical microscope capable of observing plural types of images obtained from the same specimen has been developed. For example, in a confocal laser microscope, two types of images, that is, a confocal image and a non-confocal image, can be obtained as a laser scanning microscopic (LSM) image. A high-contrast confocal image can be obtained by performing XY scanning using a fine spot beam and by forming an image only from the light from the focusing position on the specimen through a pinhole. An image obtained without a pinhole is a non-confocal image having an image-forming characteristic similar to that of a normal optical microscope.

With the above-mentioned confocal laser microscope, the obtained confocal image and non-confocal image can be displayed as overlaid (for example, refer to Japanese Patent Application Publication No. 2000-098241) or as switched (for example, refer to Japanese Patent Application Publication No. 09-133869).

Also a scanning optical microscope for simultaneously displaying a fluorescent image and a transmission image on a display has been proposed (for example, Japanese Patent No. 3326881).

SUMMARY OF THE INVENTION

The confocal laser microscope as the first aspect of the present invention includes an image generation device and a display device, and obtains a microscopic image while performing two-dimensional scanning using a laser beam converged on an observation target. The image generation device generates a confocal image and a non-confocal image of an observation target from the light reflected by the observation target, and the display device displays the confocal image and the non-confocal image side by side on the same screen.

The confocal laser microscope as the second aspect of the present invention includes a first image generation device, a second image generation device, and a display device, and obtains a microscopic image by performing two-dimensional scanning using a laser beam converged on an observation target. The first image generation device generates a laser scanning microscopic image of the observation target from the light reflected by the observation target. The second image generation device generates a video image of an observation target captured by a camera. The display device displays the laser scanning microscopic image and the video image side by side on the same screen.

The confocal laser microscope as the third aspect of the present invention includes an image generation device, a display device, and an operation device, and obtains a microscopic image by performing two-dimensional scanning using a laser beam converged on an observation target. The image generation device emits a laser beam or other illuminating light to the observation target, and generates a plurality of images of the observation target. The display device displays the images side by side on the same screen. The operation device can change at least one attribute of zoom magnification, display size, display position, brightness, and contrast of the plurality of images displayed side by side on the screen. When one of the images is selected, and the operation device changes one of the attributes of zoom magnification, display size, display position, brightness, and contrast, the confocal laser microscope changes the attribute of unselected images in an engaged operation or independently depending on an instruction of a change operation.

BRIEF DESCRIPTION OF THE DRAWINGS

The present invention will be more apparent from the following detailed description when the accompanying drawings are referenced.

DESCRIPTION OF THE PREFERRED EMBODIMENTS

The best modes for embodying the present invention are described below by referring to the attached drawings.

In an embodiment of the present invention, a displayed confocal image includes the following images.

a confocal LSM image obtained by detecting reflected light from an observation target through a pinhole obtained by performing two-dimensional scanning using a laser beam image data (stored image) obtained by the above-mentioned method through a pinhole and stored in an image storage device A displayed non-confocal image includes the following images.

a non-confocal LSM image obtained by detecting reflected light from an observation target without a pinhole obtained by performing two-dimensional scanning using a laser beam image data (stored image) obtained by the above-mentioned method without a pinhole and stored in an image storage device a video (TV) image captured by a camera (digital or analog)

image data (stored image) captured by the camera and stored in an image storage device If a confocal LSM image and a non-confocal LSM image, or an LSM image (confocal LSM image and/or non-confocal LSM image) and a video image are displayed side by side on the same screen, the images can be efficiently observed by simultaneously using them as separately recognizable information. Thus, by simultaneously observing a plurality of images in different microscopical methods, more pieces of information can be efficiently obtained. Furthermore, when the attributes of a plurality of images displayed side by side are changed in an engaged operation or independently, observation can be performed more efficiently.

Figure 1:
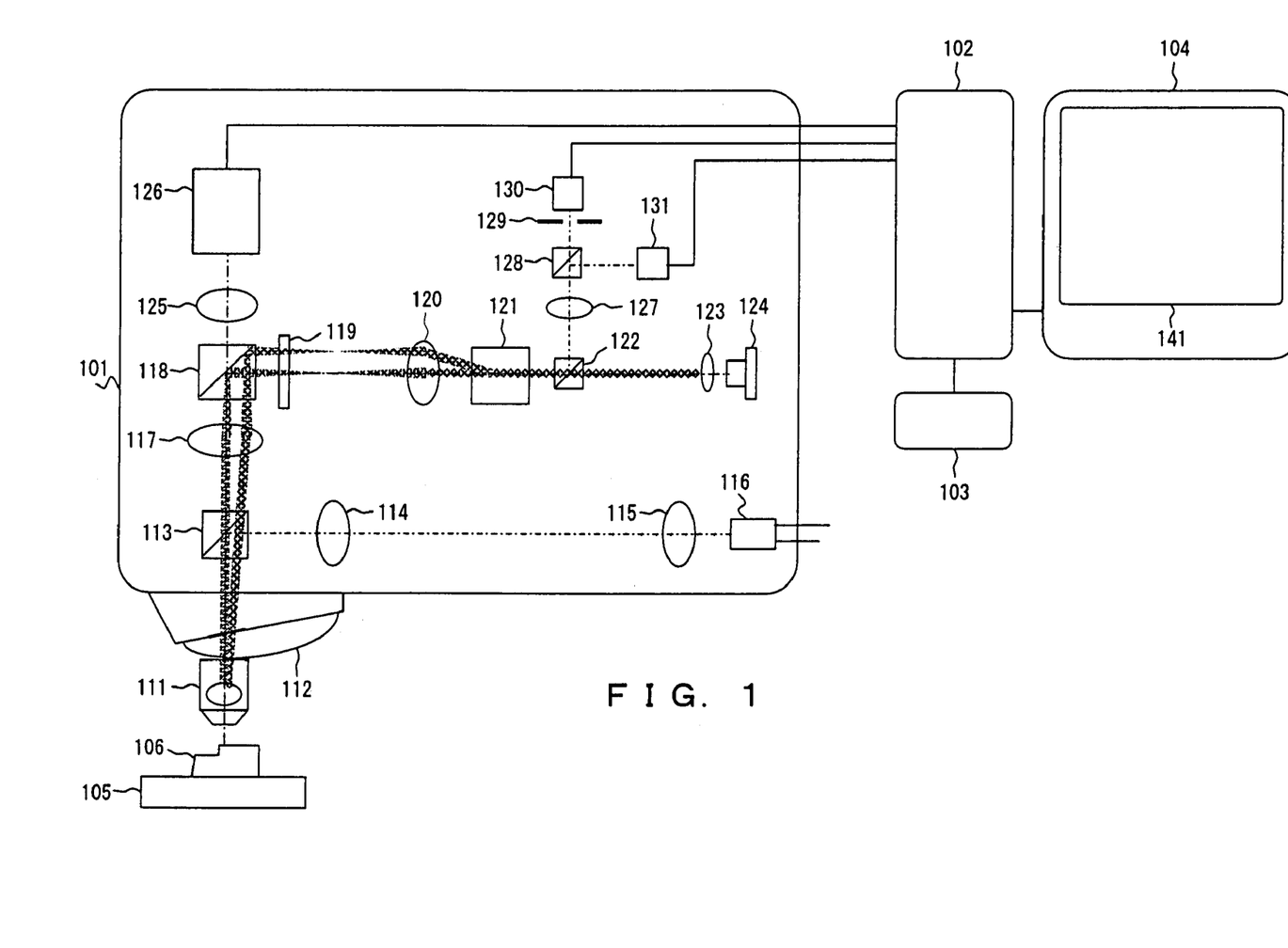
FIG. 1 shows the configuration of a confocal laser microscope.

FIG. 1 shows the configuration of a confocal laser microscope according to an embodiment of the present invention. The confocal laser microscope shown in FIG. 1 comprises a body of the microscope 101, a controller 102, an input device 103, a display device 104, and a specimen table 105.

The body of the microscope 101 comprises an objective lens 111, a revolver 112, beam splitters 113, 118, and 128, an illumination lens 114, a collector lens 115, a white light source 116, an imaging lens 117, a ¼ wavelength plate 119, a pupil projection lens 120, an optical scanner 121, a polarization beam splitter 122, a collimating lens 123, a collective lens 127, a laser beam source 124, a TV lens 125, a video image taking CCD (Charge Coupled Device) camera 126, a pinhole 129, a confocal LSM image taking detector 130, and a non-confocal LSM image taking detector 131.

The optical scanner 121 can be, for example, a galvanomirror. The detectors 130 and 131 are, for example, a photomultiplier. The white light source 116 can be, for example, a white light illuminating fiber light source.

When an LSM image (confocal LSM image and/or non-confocal LSM image) is obtained, a laser beam (illuminating light) output from the laser beam source 124 is converged as a spot beam on a specimen 106 placed on the specimen table 105, through the collimating lens 123 and the polarization beam splitter 122, the optical scanner 121, the pupil projection lens 120, the ¼ wavelength plate 119, the beam splitter 118, the imaging lens 117, the beam splitter 113, and the objective lens 111. When the illuminating light is processed by the two-dimensional scanning by the optical scanner 121, the spot beam on the specimen 106 is scanned in the X and Y directions.

The reflected light from the specimen 106 passes the above-mentioned optical path in the inverse direction from the objective lens 111 to the polarization beam splitter 122, and led to the collective lens 127 by the polarization beam splitter 122. The reflected light which has passed through the collective lens 127 is branched into two by the beam splitter 128, that is, one input to the confocal LSM image taking detector 130 through the pinhole 129 and the other input to the non-confocal LSM image taking detector 131.

When a video image is obtained, the illuminating light output from the white light source 116 illuminates the specimen 106 through the collector lens 115, the illumination lens 114, the beam splitter 113, and objective lens 111. The reflected light from the specimen 106 is input to the CCD camera 126 through the objective lens 111, the beam splitter 113, the imaging lens 117, the beam splitter 118, and the TV lens 125.

In the LSM detection system including the detectors 130 and 131, the CF system into which the pinhole 129 is inserted and the NCF system without the pinhole 129 are arranged such that they can simultaneously detect reflected light through the beam splitter 128. In this case, LSM signals of two channels (CHs) are output from the detectors 130 and 131.

In the CCD optical system including the video image taking CCD camera 126, a video image illuminated by the illuminating light from the white light source 116 is obtained. In this case, a CCD signal of 1 CH is output from the video image taking CCD camera 126. At this time, the laser beam from the laser beam source 124 is turned off.

The LSM signals of 2 CHs and the CCD signal of 1 CH are input to the controller 102 connected to the body of the microscope 101, and the controller 102 can simultaneously obtain them. That is, the body of the microscope 101 can simultaneously output image signals of two or more CHs. The obtained image is displayed on a monitor screen 141 of the display device 104.

The feature of an image obtained by each CH is described as follows.

Confocal LSM Image

A monochrome image having high contrast and a small depth of focus is obtained, and is used in measurement and observation. However, since it is difficult to perform focusing and designate the observation point (positioning) on the specimen 106 using only a non-confocal LSM image, the channel for the non-confocal image such as a non-confocal LSM image and a video image is required. Furthermore, by combining images of 2 CHs, an entire image (image having large depth of focus) and a partial image (image having large depth of focus) can be observed, or the observation including color information can be simultaneously performed.

Non-confocal LSM Image

A monochrome image having relatively high contrast and depth of focus of a normal microscope can be obtained, and is used in focusing, positioning, and observation.

Video Image

An image of a normal microscope including color information can be obtained, and is used in focusing, positioning, and observation. Furthermore, it is possible to use a microscopical method such as darkfield microscopy and DIC (differentiation interference contrast) microscopy.

The LSM detection system and the controller 102 function as an image generation device for generating a confocal LSM image and a non-confocal LSM image, and the CCD optical system and the controller 102 function as an image generation device for generating a video image.

Figure 2:
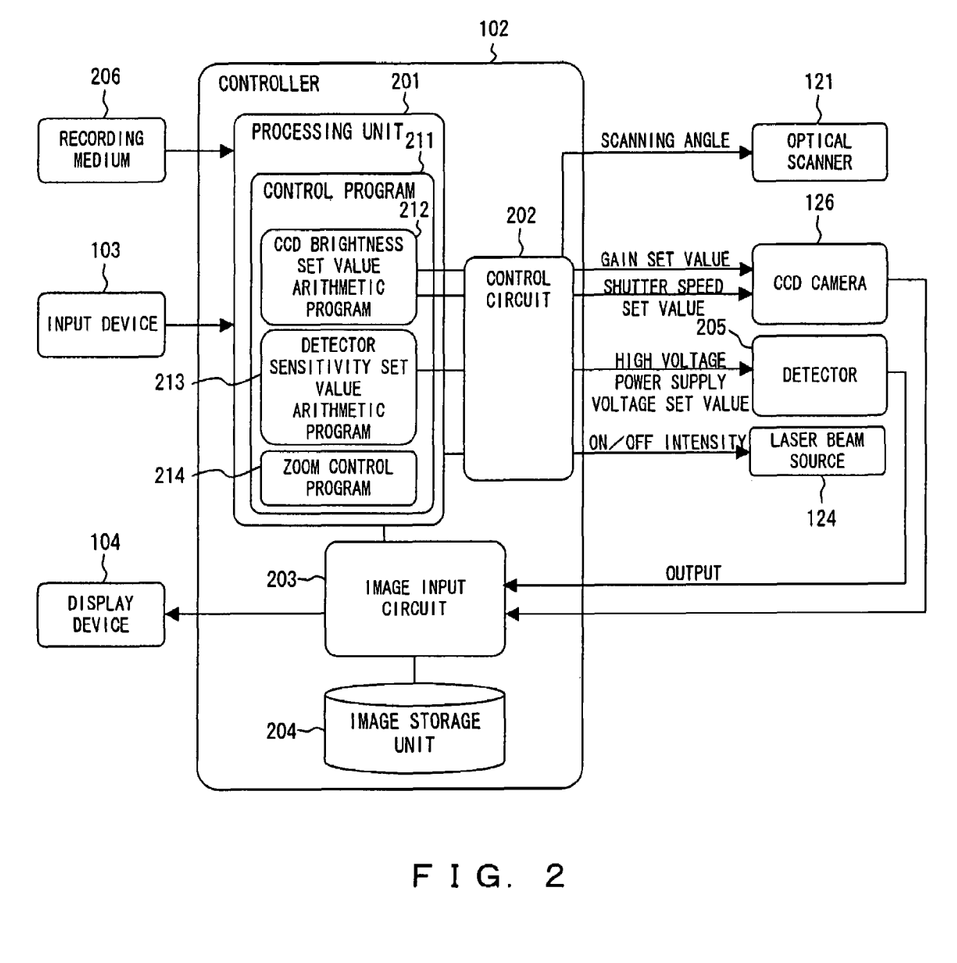
FIG. 2 shows the configuration of a controller.

FIG. 2 shows the configuration of the controller 102 shown in FIG. 1. The controller 102 corresponds to the information processing device (computer) such as a personal computer, and is configured by a processing unit 201, a control circuit 202, an image input circuit 203, and an image storage unit 204. The processing unit 201 has a CPU (central processing unit) and memory, and the memory includes ROM (read only memory) and RAM (random access memory).

The input device 103 functions as an operation device and a luminance profile operation device, and the memory of the processing unit 201 and the image storage unit 204 function as an image storage device.

The CPU of the processing unit 201 controls the control circuit 202 and the image input circuit 203 by executing a control program 211 using memory, and performs a necessary process for displaying an image. The control program 211 comprises a CCD brightness set value arithmetic program 212, a detector sensitivity set value arithmetic program 213, and a zoom control program 214.

The programs and data used in the processing unit 201 can be loaded on the memory of the processing unit 201 through a computer-readable recording medium 206 such as a memory card, a flexible disk, CD-ROM (compact disk read only memory), an optical disk, a magneto-optical disk, etc. These programs and data can also loaded on the memory from an external device through the communications network. In this case, the external device generates a propagation signal for propagating a program and data, and transmits it to the controller 102 through the communications network.

The input device 103 can be, for example, a keyboard, a pointing device such as a mouse, a touch panel, etc., and inputs an instruction and information from a user to the processing unit 201 through the graphical interface (GUI). The CCD camera 126, a detector 205, the optical scanner 121, and the laser beam source 124 are controlled by the processing unit 201 through the control circuit 202. In this case, the detector 205 corresponds to the detectors 130 and 131 shown in FIG. 1.

When an LSM image and a video image are simultaneously observed, one frame of the LSM image is captured, then one frame of the video image is captured by the control circuit 202 turning off (OFF) the laser beam source 124. Then, by the control circuit 202 turning on (ON) the laser beam source 124, one frame of the LSM image is captured, thereafter repeating the similar control. Thus, by switching the capture of the LSM image and the video image for each frame, the LSM image and the video image can be simultaneously observed. The switching timing is controlled by the processing unit 201 through the control circuit 202.

The laser beam source 124 is turned off by turning off the laser diode (LD) or cutting off a laser beam from the LD by a shutter, etc., and the control circuit 202 can also control the intensity of the laser beam.

The image signal from the detector 205 is input to the image input circuit 203, and output as an LSM image to the display device 104.

An image signal from the CCD camera 126 is input to the image input circuit 203, and output as a video image to the display device 104. Furthermore, the image input circuit 203 can retrieve an image stored in advance in the image storage unit 204 and output to the display device 104.

The brightness of a displayed image can be adjusted by the control program 211 according to an instruction from a user. In this case, the CCD brightness set value arithmetic program 212 and the detector sensitivity set value arithmetic program 213 respectively calculate a CCD parameter and a detector parameter, and a specified brightness is replaced with a parameter and output to the CCD camera 126 and the detector 205. As a CCD parameter, for example, a gain set value and/or a shutter speed set value can be used. As a detector parameter, for example, a set value of a voltage of a photomultiplier high voltage power supply is used.

Normally, the CCD brightness set value arithmetic program 212 and the detector sensitivity set value arithmetic program 213 change the parameters such that the output from the CCD camera 126 and the detector 205 can change at the same rate. Therefore, it is not necessary for a user to consciously distinguish the LSM image and the video image. However, for example, it is possible to specify that only the video image can be brighter. In this case, it is possible to specify different brightness between the LSM image and the video image.

The zoom magnification of the displayed image can also be adjusted by the control program 211 according to an instruction of a user. In this case, the zoom control program 214 adjusts the zoom magnification in the following method, for example.

In the case of an LSM image, the zoom of a generated image can be realized by reducing the scanning angle of the optical scanner 121 by the scanning angle control by the control circuit 202. When the scanning angle of the optical scanner 121 is reduced, the range of the actual scanning of a laser beam is narrowed. If an image is generated in units of detected pixels using the reflected light from the narrowed range, the generated image is the same as an enlarged image.

In the case of a video image, a zoom magnification can be changed by enlarging the pixel of an image captured by the CCD camera 126 in the digital processing by the image input circuit 203. By providing a zoom optical system which can be realized by relatively moving at least two lenses in the optical path leading to the CCD camera 126, and performing a drive control of the zoom optical system by the control circuit 202, the zoom magnification can be changed.

Figure 3:
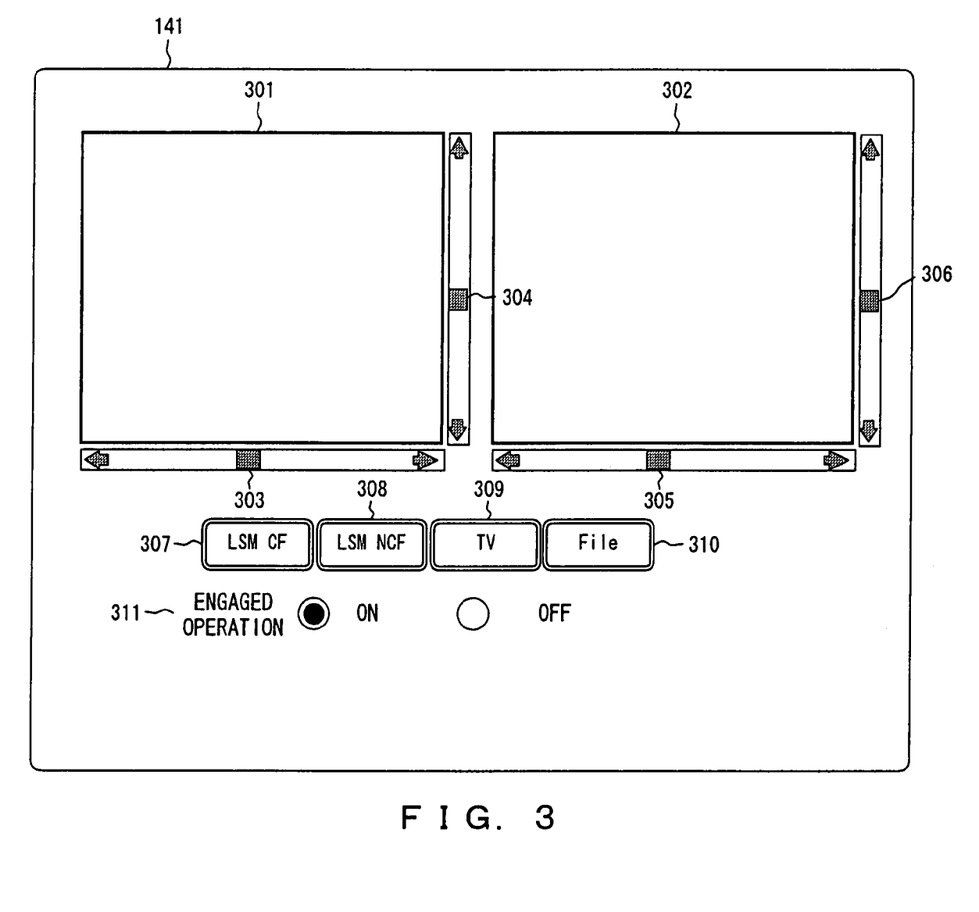
FIG. 3 shows a first example of a monitor screen.

FIG. 3 shows a display example of the monitor screen 141 of the display device 104. In this example, the LSM image being observed and the video image being observed, or the stored image stored in the image storage unit 204 are displayed in image display windows 301 and 302. The displayed images are selected by image channel selection buttons 307 through 310. A confocal LSM image, a non-confocal LSM image, a video image, and a stored image are selected when the buttons 307, 308, 309, and 310 are clicked by a mouse, etc., respectively.

First, when an image of any channel is selected, the selected image is displayed in a predetermined window size. When the second image is selected, the image display window is divided into two parts. The first selected image is displayed in the left window 301, and the second selected image is displayed in the right window 302.

When another image is selected, the display of the first selected image is released, and the last selected image is displayed instead. Alternatively, when the display of the first image is released, the second image can be transferred from the window 302 to the window 301, and the last image can be displayed in the window 302. Afterwards, similar display processes are repeated. The selection of an image can be released by clicking again the same button.

A stored image selected by the button 310 can be an LSM image or a video image observed in the past, or a reference image, etc. prepared in advance. These images can be displayed for comparing other parts of the same specimen, or can be displayed as a discrimination standard for product manufacturing management.

A user can change the display size of an image. When the display size is larger than the window, scroll bars 303 through 306 can move the display position. It is also possible to adjust the zoom magnification, brightness, contrast, etc. These operations can be selected between an engaged operation mode and an unengaged operation mode by an operation engagement/non-engagement selection button 311 (or on a setting screen such as a menu).

When the button 311 is turned on, and the engaged operation mode is selected, the images in the two windows 301 and 302 can be simultaneously operated. In this case, when at least one of the attributes of the zoom magnification, display size, display position, brightness, contrast, etc. of the image in one window is changed, the attribute of the other image is changed in an engaged operation.

For example, if a user changes the brightness of an LSM image with the LSM image and a video image respectively displayed in the windows 301 and 302, the CCD brightness set value arithmetic program 212 and the detector sensitivity set value arithmetic program 213 shown in FIG. 2 simultaneously control the CCD camera 126 and the detector 205 through the control circuit 202. Thus, the brightness of the two images is changed in the engaged operation. If the user changes the zoom magnification of one image, then the other image is also changed to the same zoom magnification in the engaged operation.

In the above-mentioned engaged operation mode, the user can simultaneously perform an operation on the two windows, thereby efficiently performing an observation.

On the other hand, when the button 311 is turned off, and the unengaged operation mode is selected, the images in the two windows 301 and 302 can be separately operated. For example, only the brightness of the video image can be selectively changed with the LSM image and the video image displayed in the windows 301 and 302. Furthermore, if the zoom magnification of an LSM image is to be enhanced (enlarged) while observing a wide field of a video image, the unengaged operation mode is very useful.

Figure 4:
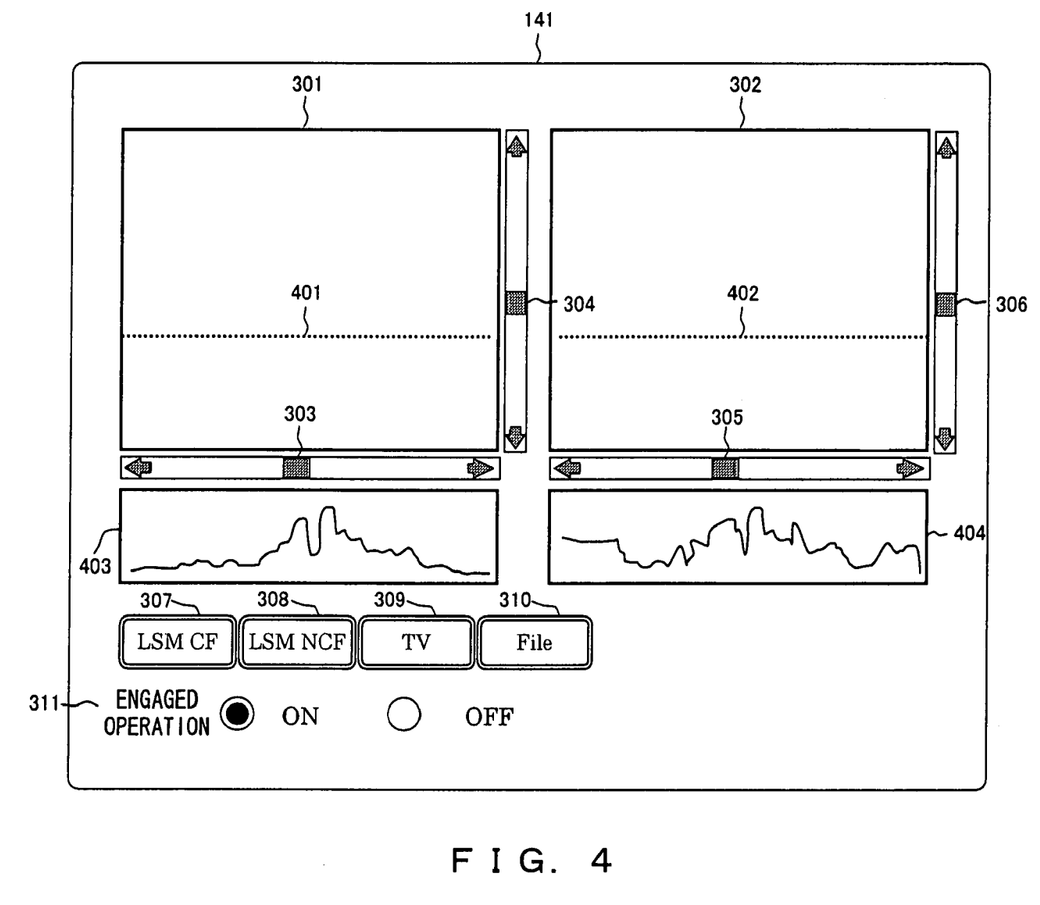
FIG. 4 shows a second example of a monitor screen.
Figure 5:
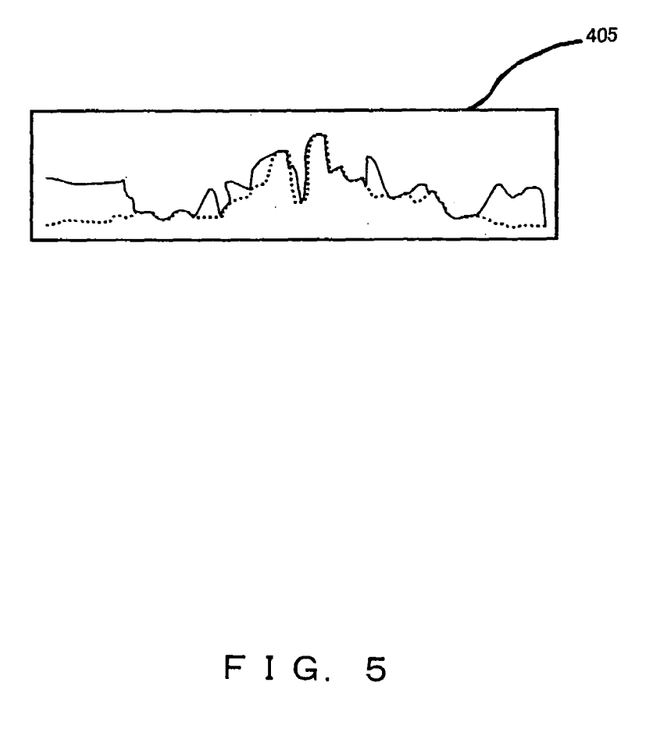
FIG. 5 shows an overlay display of luminance profiles.

As shown in FIG. 4, luminance profile position designation lines 401 and 402 are respectively displayed in the two windows 301 and 302, and luminance profiles on the lines can be displayed in separate windows 403 and 404. Alternatively, as shown in FIG. 5, the luminance profiles on the two lines can be overlaid with each other in one window 405.

On the monitor screen 141 shown in FIG. 4, using the operation engagement/non-engagement selection button 311 (or on a setting screen such as a menu), the engaged operation for selection of display/non-display, scale change, display position change, etc. of the luminance profiles in the windows 403 and 404 can be performed. By displaying the luminance profile the distribution of the brightness of each image can be quantitatively grasped.

Figure 6:
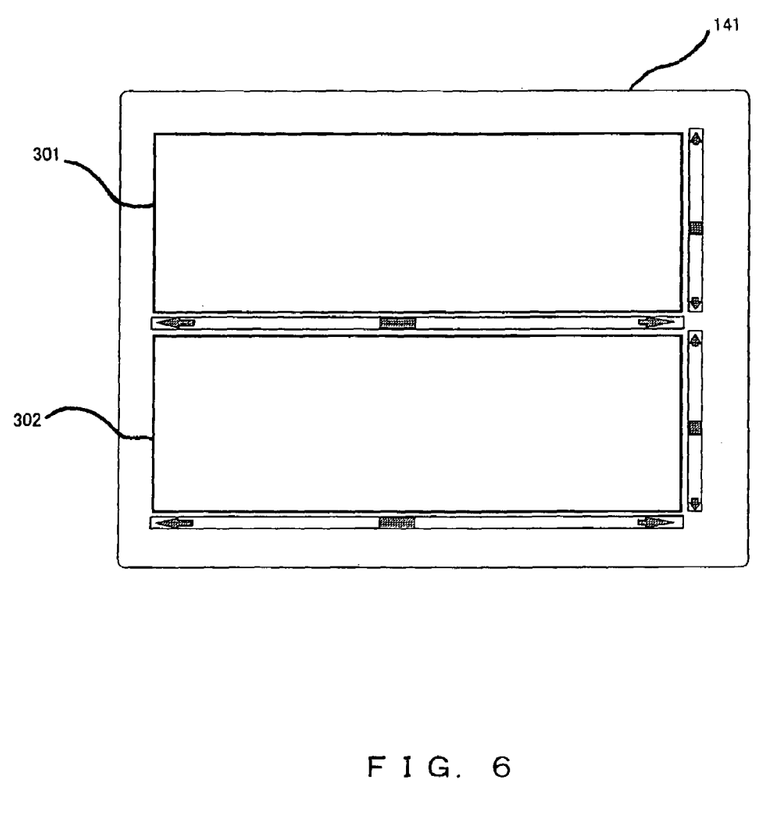
FIG. 6 shows a third example of a monitor screen.

In FIGS. 3 and 4, two images 301,302 are displayed left and right on the monitor screen 141, however, the two images 301,302 can also be displayed above and below as shown in FIG. 6. It is also possible to display three or more images side by side on the same screen to operate them in the engaged operation mode.

Figure 7:
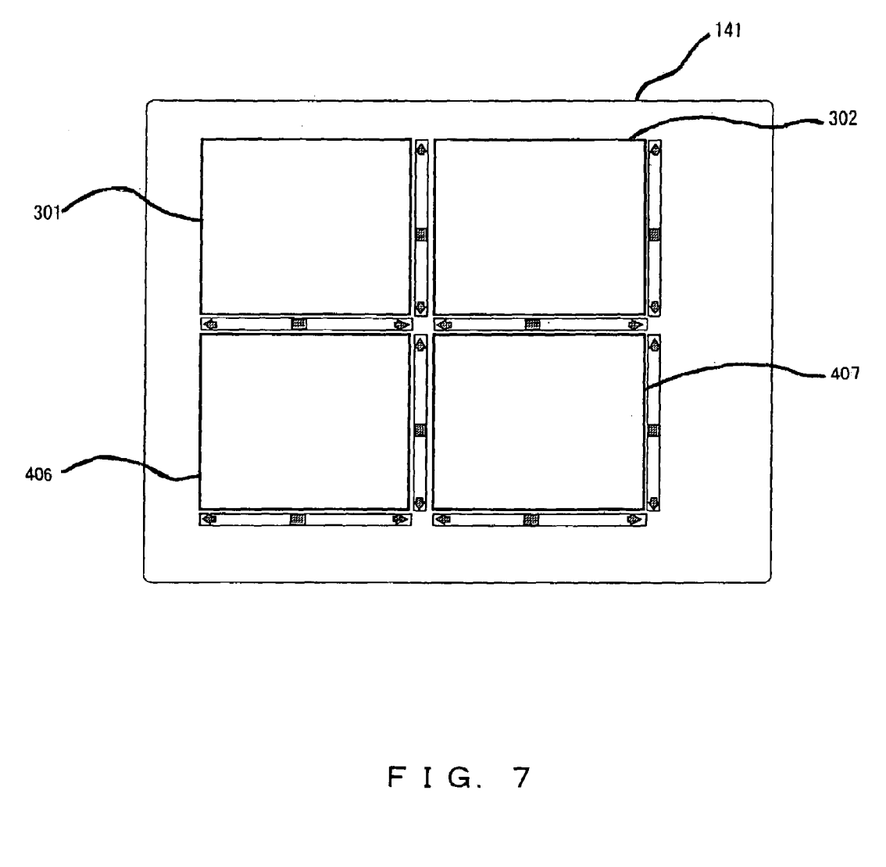
FIG. 7 shows a fourth example of a monitor screen.

For example, when four images 301,302,406,407 are arranged and displayed, the display method as shown in FIG. 7 is used. In this display method, a 4 CH display for a combination of a confocal LSM image being observed, a non-confocal LSM image being observed, a video image being observed, and a stored image, a combination of a confocal LSM image being observed, a video image being observed, the first stored image, and the second stored image, etc. can be realized.

If the LSM image and the video image observed in the past as the first and second stored images are displayed, the two images being observed can be compared with the corresponding past images. Therefore, when an acceptance determination is made using a similar sample, the images can be efficiently compared with each other.

What is claimed is:

1. A confocal laser microscope which obtains a microscopic image while performing two-dimensional scanning using a laser beam converged on an observation target, comprising:
an image generation device for generating a confocal image and a non-confocal image of the observation target from light reflected by the observation target;
a display device for displaying a plurality of images each of which is the confocal image or the non-confocal image, side by side on a same screen; and
a luminance profile operation device, wherein
the display device further displays on the screen luminance profiles of the plurality of images displayed side by side on the screen, and the luminance profile operation device simultaneously performs an operation to change at least one of a scale and a display position of the luminance profiles of the plurality of images such that the luminance profiles of the plurality of images can be changed in an engaged operation.

2. The confocal laser microscope according to claim 1, wherein
the display device displays at least two images of the confocal image which is generated by detecting the reflected light from the observation target through a pinhole, the non-confocal image which is generated by detecting the reflected light from the observation target without a pinhole, and the non-confocal image of the observation target which is captured by a camera, side by side on the same screen.

3. The confocal laser microscope according to claim 1, further comprising
an image storage device storing a stored image for comparison observation, wherein
the display device displays at least two images of the confocal image, the non-confocal image, and the stored image side by side on the same screen.

4. The confocal laser microscope according to claim 3, wherein the stored image stored in the image storage device is one of a confocal image observed in the past, a non-confocal image observed in the past, and a reference image prepared in advance.

5. The confocal laser microscope according to claim 1, further comprising
an operation device capable of changing at least one attribute of zoom magnification, display size, display position, brightness, and contrast of the plurality of images displayed side by side on the screen.

6. The confocal laser microscope according to claim 5, wherein the operation device selects one of the plurality of images, and when the operation device changes at least one of the attributes of zoom magnification, display size, display position, brightness, and contrast of the selected image, an attribute of an unselected image is changed in an engaged operation or independently depending on an instruction of a change operation.

7. A confocal laser microscope which obtains a microscopic image while performing two-dimensional scanning using a laser beam converged on an observation target, comprising,
a first image generation device for generating a laser scanning microscopic image of the observation target from light reflected by the observation target;
a second image generation device for generating a video image of the observation target captured by a camera;
a display device for displaying a plurality of images each of which is the laser scanning microscopic image or the video image, side by side on a same screen; and
a luminance profile operation device, wherein
the display device further displays on the screen luminance profiles of the plurality of images displayed side by side on the screen, and the luminance profile operation device simultaneously performs an operation to change at least one of a scale and a display position of the luminance profiles of the plurality of images such that the luminance profiles of the plurality of images can be changed in an engaged operation.

8. The confocal laser microscope according to claim 7, further comprising
an operation device capable of changing at least one attribute of zoom magnification, display size, display position, brightness, and contrast of a plurality of images displayed side by side on the screen.

9. The confocal laser microscope according to claim 8, wherein the operation device selects one of the plurality of images, and when the operation device changes at least one of the attributes of zoom magnification, display size, display position, brightness, and contrast of the selected image, an attribute of an unselected image is changed in an engaged operation or independently depending on an instruction of a change operation.

10. The confocal laser microscope according to claim 7, wherein the laser scanning microscopic image in one of a confocal image which is generated by detecting the reflected light from the observation target through a pinhole and a non-confocal image which is generated by detecting the reflected light from the observation target without a pinhole.

11. A method for generating a microscopic image while performing two-dimensional scanning using a laser beam converged on an observation target in a confocal laser microscope, comprising:
  generating a confocal image and a non-confocal image of the observation target from light reflected by the observation target;
  displaying a plurality of images each of which is the confocal image or the non-confocal image, side by side on a same screen; and
  displaying on the screen luminance profiles of the plurality of images displayed side by side on the screen and simultaneously changing at least one of a scale and a display position of the luminance profiles of the plurality of images such that the luminance profiles of the plurality of images can be changed in an engaged operation.

12. A method for generating a microscopic image while performing two-dimensional scanning using a laser beam converged on an observation target in a confocal laser microscope, comprising:
  generating a laser scanning microscopic image of the observation target from light reflected by the observation target;
  generating a video image of the observation target captured by a camera;
  displaying a plurality of images each of which is the laser scanning microscopic image or the video image, side by side on a same screen; and
  displaying on the screen luminance profiles of the plurality of images displayed side by side on the screen and simultaneously changing at least one of a scale and a display position of the luminance profiles of the plurality of images such that the luminance profiles of the plurality of images can be changed in an engaged operation.

13. A confocal laser microscope which obtains a microscopic image while performing two-dimensional scanning using a laser beam converged on an observation target, comprising:
  an image generation device for generating a confocal image and a non-confocal image of the observation target from light reflected by the observation target; and
  a display device for displaying a plurality of images each of which is the confocal image or the non-confocal image, side by side on a same screen, and displaying luminance profiles of the plurality of images displayed side by side on the screen.

14. The confocal laser microscope according to claim 13, wherein the display device displays at least two images of the confocal image which is generated by detecting the reflected light from the observation target through a pinhole, the non-confocal image which is generated by detecting the reflected light from the observation target without a pinhole, and the non-confocal image of the observation target which is captured by a camera, side by side on the same screen.

15. The confocal laser microscope according to claim 13, further comprising an image storage device storing a stored image for comparison observation, wherein the display device displays at least two images of the confocal image, the non-confocal image, and the stored image side by side on the same screen.

16. The confocal laser microscope according to claim 15, wherein the stored image stored in the image storage device is one of a confocal image observed in the past, a nonconfocal image observed in the past, and a reference image prepared in advance.

17. The confocal laser microscope according to claim 13, further comprising an operation device capable of changing at least one attribute of zoom magnification, display size, display position, brightness, and contrast of the plurality of images displayed side by side on the screen.

18. The confocal laser microscope according to claim 17, wherein the operation device selects one of the plurality of images, and when the operation device changes at least one of the attributes of zoom magnification, display size, display position, brightness, and contrast of the selected image, an attribute of an unselected image is changed in an engaged operation or independently depending on an instruction of a change operation.

19. The confocal laser microscope according to claim 13, wherein the display device displays luminance profile position designation lines in the plurality of images displayed side by side on the screen, and displays the luminance profiles on the luminance profile position designation lines.

20. The confocal laser microscope according to claim 13, further comprising a luminance profile operation device for simultaneously performing an operation to change at least one of a scale and a display position of the luminance profiles of the plurality of images such that the luminance profiles of the plurality of images can be changed in an engaged operation.

21. The confocal laser microscope according to claim 13, further comprising a luminance profile operation device for performing an operation to change at least one of display/non-display, a scale, and a display position of the luminance profiles of the plurality of images in an engaged operation or independently.

22. A method for generating a microscopic image while performing two-dimensional scanning using a laser beam converged on an observation target in a confocal laser microscope, comprising:
  generating a confocal image and a non-confocal image of the observation target from light reflected by the observation target; and
  displaying a plurality of images each of which is the confocal image or the non-confocal image, side by side on a same screen and displaying luminance profiles of the plurality of images displayed side by side on the screen.

23. A confocal laser microscope which obtains a microscopic image while performing two-dimensional scanning using a laser beam converged on an observation target, comprising:
  an image generation device for generating a confocal image and a non-confocal image of the observation target from light reflected by the observation target; and
  a display device for displaying a plurality of images each of which is the confocal image or the non-confocal image, side by side on a same screen;

an operation device capable of changing at least one attribute of zoom magnification, display size, display position, brightness, and contrast of the plurality of images displayed side by side on the screen; and an engagement/non-engagement selection unit for selecting one of an engaged operation mode in which attributes of the plurality of images displayed side by side on the screen are changed in an engaged operation, and an unengaged operation mode in which the attributes of the plurality of images are changed independently, wherein the operation device selects one of the plurality of images, and when the operation device changes at least one of the attributes of zoom magnification, display size, display position, brightness, and contrast of the selected image, an attribute of an unselected image is changed in an engaged operation or independently depending on an instruction to the engagement/non-engagement selection unit.

24. The confocal laser microscope according to claim 23, wherein the display device displays at least two images of the confocal image, which is generated by detecting the reflected light from the observation target through a pinhole, the non-confocal image which is generated by detecting the reflected light from the observation target without a pinhole, and the non-confocal image of the observation target which is captured by a camera, side by side on the same screen.

25. The confocal laser microscope according to claim 23, further comprising an image channel selection unit, wherein the display device displays at least two images selected by the image channel selection unit, side by side on the same screen.

26. The confocal laser microscope according to claim 23, further comprising an image storage device storing a stored image for comparison observation, wherein the display device displays at least two images of the confocal image, the non-confocal image, and the stored image side by side on the same screen.

27. The confocal laser microscope according to claim 26, wherein the stored image stored in the image storage device is one of a confocal image observed in the past, a non-confocal image observed in the past, and a reference image prepared in advance.

28. The confocal laser microscope according to claim 23, wherein the display device displays further displays on the screen luminance profiles of the plurality of images displayed side by side on the screen.

29. The confocal laser microscope according to claim 28, further comprising a luminance profile operation device for simultaneously performing an operation to change at least one of a scale and a display position of the luminance profiles of the plurality of images such that the luminance profiles of the plurality of images can be changed in an engaged operation.

30. A confocal laser microscope which obtains a microscopic image while performing two-dimensional scanning using a laser beam converged on an observation target, comprising: an image generation device for generating a confocal image and a non-confocal image of the observation target simultaneously from light reflected by the observation target; and a display device for displaying a plurality of images each of which is the confocal image or the non-confocal image, side by side on a same screen.

31. The confocal laser microscope according to claim 30, further comprising an image storage device storing a stored image for comparison observation, wherein the display device displays at least two images of the confocal image, the non-confocal image, and the stored image side by side on the same screen.

32. The confocal laser microscope according to claim 30, further comprising an operation device capable of changing at least one attribute of zoom magnification, display size, display position, brightness, and contrast of the plurality of images displayed side by side on the screen.

33. The confocal laser microscope according to claim 32, wherein the operation device selects one of the plurality of images, and when the operation device changes at least one of the attributes of zoom magnification, display size, display position, brightness, and contrast of the selected image, an attribute of an unselected image is changed in an engaged operation or independently depending on an instruction of a change operation.

34. A confocal laser microscope according to claim 30, further comprising a luminance profile operation device, wherein the display device further displays on the screen luminance profiles of the plurality of images displayed side by side on the screen, and the luminance profile operation device simultaneously performs an operation to change at least one of a scale and a display position of the luminance profiles of the plurality of images such that the luminance profiles of the plurality of images can be changed in an engaged operation.

* * * * *